United States Patent
Karpman et al.

(10) Patent No.: US 12,499,519 B1
(45) Date of Patent: *Dec. 16, 2025

(54) TRAINING AND DEPLOYMENT OF IMAGE GENERATION MODELS

(71) Applicant: Castle Global, Inc., San Francisco, CA (US)

(72) Inventors: Dmitriy Karpman, San Francisco, CA (US); Kevin Guo, San Francisco, CA (US); Ryan Weber, San Francisco, CA (US)

(73) Assignee: Castle Global, Inc., San Francisco, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/652,139

(22) Filed: May 1, 2024

Related U.S. Application Data

(63) Continuation of application No. 18/525,628, filed on Nov. 30, 2023, now Pat. No. 11,995,803.

(60) Provisional application No. 63/487,552, filed on Feb. 28, 2023.

(51) Int. Cl.
*G06T 5/70* (2024.01)

(52) U.S. Cl.
CPC ...... *G06T 5/70* (2024.01); *G06T 2207/20081* (2013.01); *G06T 2207/20084* (2013.01)

(58) Field of Classification Search
CPC ............. G06T 5/70; G06T 2207/20081; G06T 2207/20084
USPC ........................................................ 382/254
See application file for complete search history.

(56) References Cited

U.S. PATENT DOCUMENTS

| | | |
|---|---|---|
| 8,429,173 B1 | 4/2013 | Rosenberg et al. |
| 11,216,506 B1 | 1/2022 | Ranzinger |
| 11,514,337 B1 | 11/2022 | Karpman et al. |
| 2016/0042252 A1 | 2/2016 | Sawhney et al. |
| 2016/0042253 A1 | 2/2016 | Sawhney et al. |
| 2020/0314507 A1 | 10/2020 | Yen |
| 2021/0365500 A1 | 11/2021 | Gunaselara et al. |
| 2022/0164643 A1 | 5/2022 | Charnock et al. |
| 2022/0198779 A1 | 6/2022 | Saraee et al. |
| 2022/0398538 A1 | 12/2022 | Jakobsson et al. |

FOREIGN PATENT DOCUMENTS

WO 2020022956 A1 1/2020

OTHER PUBLICATIONS

Hao, Yaru, et al. "Optimizing Prompts for Text-to-Image Generation." arXiv preprint arXiv:2212.09611 (2022). (Year: 2022).*

(Continued)

*Primary Examiner* — Jonathan S Lee
(74) *Attorney, Agent, or Firm* — Kwan & Olynick LLP

(57) ABSTRACT

In some embodiments, a method receives a text prompt. A text encoder is executed on the text prompt to generate a representation. The method generates a set of images based on the representation and a set of parameters of an image generation model. The set of images is ranked using reward values that are generated by a reward model. The reward model is trained using human input that provided feedback on a quality of generated images using the image generation model. The method outputs one or more images based on the ranking in response to the text prompt.

20 Claims, 8 Drawing Sheets

(56) References Cited

OTHER PUBLICATIONS

Lee, Kimin, et al. "Aligning text-to-image models using human feedback." arXiv preprint arXiv:2302.12192 (2023). (Year: 2023).*

Prabhudesai, Mihir, et al. "Aligning Text-to-Image Diffusion Models with Reward Backpropagation." arXiv preprint arXiv:2310.03739 (2023). (Year: 2023).*

Dong, Hanze, et al. "Raft: Reward ranked finetuning for generative foundation model alignment." arXiv preprint arXiv:2304.06767 (2023). (Year: 2023).*

Xu, Jiazheng, et al. "ImageReward: Learning and Evaluating Human Preferences for Text-to-Image Generation." arXiv preprint arXiv:2304.05977 (2023). (Year: 2023).*

Sun, Jiao, et al. "Dreamsync: Aligning text-to-image generation with image understanding feedback." arXiv preprint arXiv: 2311.17946 (2023). (Year: 2023).*

Kirstain, Yuval, et al. "Pick-a-Pic: An Open Dataset of User Preferences for Text-to-Image Generation." arXiv preprint arXiv: 2305.01569 (2023). (Year: 2023).*

U.S. Appl. No. 17/544,615, filed Dec. 7, 2022, Inventor Dmitriy Karpman, Titled: "Logo Detection and Procesing Data Model", 54 pages.

U.S. Appl. No. 18/525,628, filed Nov. 30, 2023, Inventor Dmitriy Karpman, Titled: "Training and Deployment of Image Generation Models", 63 pages.

U.S. Appl. No. 63/316,371, filed Mar. 3, 2022, Inventor Dmitriy Karpman.

U.S. Appl. No. 63/481,375, filed Jan. 24, 2023, Inventor Dmitriy Karpman, Titled: "Detecting and Monitoring Unauthorized Uses of Visual Content", 52 pages.

Clark, Kevin, et al. "Directly fine-tuning diffusion models on differentiable rewards." arXiv preprint arXiv:2309.17 400 (2023). (Year: 2023).

Gal, Rinon, et al. "An image is worth one word: Personalizing text-to-image generation using textual inversion." arXiv preprint arXiv: 2208.01618 (2022). (Year: 2022).

Lu, Haoming, et al. "Specialist Diffusion: Plug-and-Play Sample-Efficient Fine-Tuning of Text-to-Image Diffusion Models To Learn Any Unseen Style." Proceedings of the IEEE/CVF Conference on Computer Vision and Pattern Recognition. 2023. (Year: 2023).

Rombach, Robin, et al. "High-resolution image synthesis with latent diffusion models." Proceedings of the IEEE/CVF conference on computer vision and pattern recognition. 2022. (Year: 2022).

Sun, Gan, et al. "Create your world: Lifelong text-to-image diffusion." arXiv preprint arXiv:2309.04430 (2023). (Year: 2023).

Wen, Song, et al. "Improving compositional text-to-image generation with large vision-language models." arXiv preprint arXiv: 2310.06311 (2023). (Year: 2023).

Wu, Qiucheng, et al. "Harnessing the spatial-temporal attention of diffusion models for high-fidelity text-to-image synthesis." Proceedings of the IEEE/CVF International Conference on Computer Vision. 2023. (Year: 2023).

Wu, Xiaoshi, et al. "Human Preference Score: Better Aligning Text-to-image Models with Human Preference." Proceedings of the IEEE/CVF International Conference on Computer Vision. 2023. (Year: 2023).

Xie, Jinheng, et al. "Boxdiff: Text-to-image synthesis with training-free box-constrained diffusion." Proceedings of the IEEE/CVF International Conference on Computer Vision. 2023. (Year: 2023).

* cited by examiner

Interface 400

Select Style 412

| Style 1 | Style 2 | Style 3 |
| Style 4 | Style 5 | Style 6 |
| Style 7 | Style 8 | Style 9 |
| Style 10 | Style 11 | Style 12 |

FIG. 4C

Interface 400

416

Generated image 1 | Generated image 2 | Generated image 3

Generated image 4 | Generated image 5 | Generated image 6

Mystical 420

Description – Cyborg medeval warrior face
418

FIG. 4D

TRAINING AND DEPLOYMENT OF IMAGE GENERATION MODELS

CROSS-REFERENCE TO RELATED APPLICATIONS

This application is a continuation application and, pursuant to 35 U.S.C. § 120, is entitled to and claims the benefit of earlier filed application U.S. application Ser. No. 18/525,628, filed Nov. 30, 2023, entitled "TRAINING AND DEPLOYMENT OF IMAGE GENERATION MODELS", which pursuant to 35 U.S.C. § 119(e), this application is entitled to and claims the benefit of the filing date of U.S. Provisional App. No. 63/487,552 filed Feb. 28, 2023, entitled "TRAINING AND DEPLOYMENT OF IMAGE GENERATION MODELS", the contents of all of which are incorporated herein by reference in their entireties for all purposes.

This application is related to U.S. patent application Ser. No. 18/421,825, filed on Jan. 24, 2024, which claims priority to U.S. Provisional Patent Application No. 63/481,375, filed on Jan. 24, 2023, which are hereby incorporated in their entireties by this reference. This application is related to U.S. patent application Ser. No. 17/544,615 (now U.S. patent Ser. No. 11/514,337B1), filed on 7 Dec. 2021, which is hereby incorporated in its entirety by this reference.

TECHNICAL FIELD

The present disclosure relates generally to the field of artificial intelligence and more specifically to new and useful systems and methods for training and deploying text-to-image generative models.

BACKGROUND

In recent years, advances in language modeling and diffusion models have significantly increased the capabilities of deep learning networks in generating customizable photorealistic and/or particularly stylized images from natural language prompts, leading to significant public and industry attention on their capability to rapidly generate high quality digital artwork. The visual appeal and fidelity of images created by these so-called "generative" models" may not always be satisfactory to users.

BRIEF DESCRIPTION OF THE FIGURES

FIG. 4C depicts an example of the overlay tab for the style menu according to some embodiments.

FIG. 4D depicts an example of a results interface according to some embodiments.

DETAILED DESCRIPTION OF THE EMBODIMENTS

The following description of embodiments is not intended to limit the disclosure to these embodiments, but rather to enable a person skilled in the art to make and use the embodiments. Variations, configurations, implementations, example implementations, and examples described herein are optional and/or interchangeable and are not exclusive and/or limited to the variations, configurations, implementations, example implementations, and examples they describe. The disclosure described herein can include or define any and all permutations of these variations, configurations, implementations, example implementations, and examples.

System Overview

The visual appeal and fidelity of images created by generative models depends on different factors, such as (1) the model's semantic understanding of visual concepts described by natural language prompts used to generate images; (2) the quantity and quality of training data used; and (3) the extent to which the generated image aligns with human expectations in terms of both alignment with (e.g., fidelity to) the natural language query and aesthetic quality. The present system pre-trains a model to recognize text and generate images using advances to the above factors.

System

Figure 1:
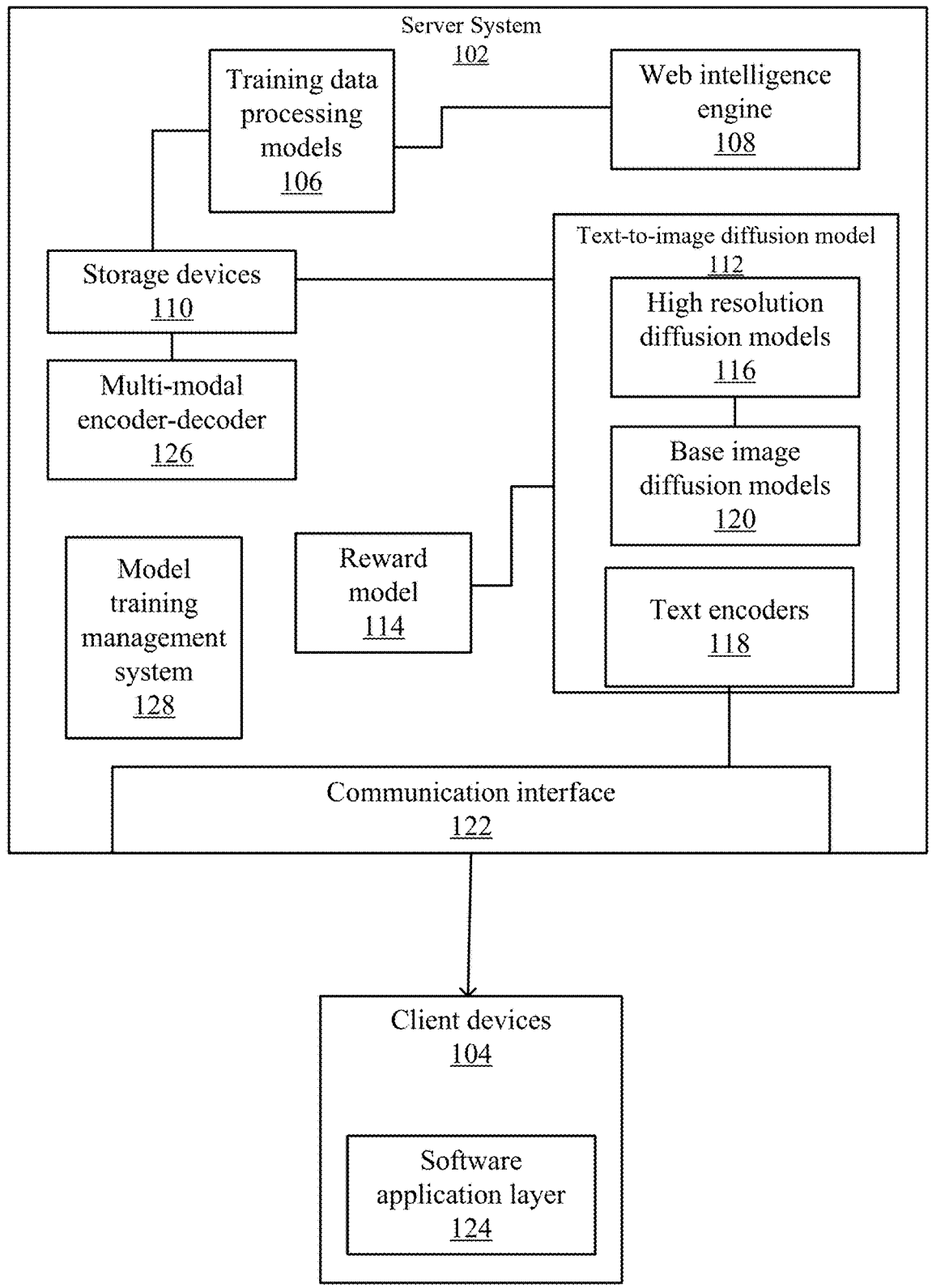
FIG. 1 depicts a system for generating images according to some embodiments.

FIG. 1 depicts a system 100 for generating images according to some embodiments. System 100 includes a server system 102 and client device(s) 104. Server system 102 includes processors and memory resources storing computer-executable instructions that define training data processing models 106, such as a set of content moderation models, a visual aesthetics model, a watermark detection model; a web intelligence engine 108; a text-to-image diffusion model 112, a reward model 114, and a set of storage devices no.

As described below, the web intelligence engine 108 may include a set of web crawler software modules configured to automatically review content, including locating, fetching, ingesting and/or downloading image content and associated alternate text hosted on web pages or other content. The set of storage devices no may store information for content, such as a repository, database, and/or index of content (e.g., images, text, and/or text-image pairs), that is used to train the text-to-image diffusion model 112. The information may include images and/or text accessed from by public or private networks (e.g., the internet) by the web intelligence engine 108 and/or pre-defined training or evaluation datasets. Server system 102 generally includes and/or interfaces with a model training management system 128 configured to access and transmit content data from the set of storage devices 11o to the text-to-image diffusion model 112 during pre-training, training, and fine-tuning stages as described below.

As shown in FIG. 1, the system includes a text-to-image diffusion model 112. Text-to-image diffusion model 112 may be a probabilistic generative model used to generate image data. In some embodiments, text-to-image diffusion model 112 may include multiple sub-models that improve the image generation. For example, text-to-image diffusion model 112 may define a (set of) pre-trained text encoders 118 (e.g., one or more pre-trained language models), base image diffusion models 120, and high-resolution diffusion models 116. Text encoders 118 interpret a text query and generate an embedding of the text query. Base image diffusion models 120 generate a base image (e.g., an initial, low-resolution image) from the embedding. High-resolution diffusion models 116 are configured to progressively upsample the images to larger sizes and/or resolutions. For example, high-resolution diffusion models 116 are configured to upsample images generated by the base image diffusion model 120 to higher resolutions and/or levels of detail. A hierarchy of multiple diffusion models, such as base image diffusion model 120 and high-resolution diffusion models 116 allows each one to add details and upscale the image to a larger size, rather than having to make the full-size image all at once. Base image diffusion model 120 may operate in the latent space to interpret the text embedding. High-resolution diffusion models 116 may operate in the pixel space, as opposed to the latent space, which avoids the issues associated with image encoding and decoding, and improves the generation of images, such as faces, text, and other details. Although multiple models are described, models may be used to generate the full-size image from the embedding without upscaling.

Text-to-image diffusion model 112 can execute the base image diffusion model 120 (and the high-resolution diffusion models 116) on the assembled training set (e.g., text-image pairs) to infer and/or encode custom parameters for iteratively transforming randomly sampled visual noise into a visually appealing synthetic image that aligns with visual concepts described by a text prompt. By analyzing a large (e.g., million-scale, billion-scale) set of image-text pairs that meet quality standards enforced by the set of visual classifiers and captioner and filter modules, and by training and/or conditioning on outputs of multiple (different) text encoders 118, the text-to-image diffusion model 112 can therefore develop superior vision-language understanding and generalizability during training. Additionally, the system 102 can fine-tune the text-to-image diffusion model 112 using outputs of a human visual preference model (e.g., a reward model 114) trained on human input judgments of aesthetic quality and/or text-image alignment, thereby incorporating (simulated) human feedback on images generated by the text-to-image diffusion model 112 to further improve the model's performance on image generation tasks during operation.

System 100 incorporates a communication interface 122 (e.g., an application programming interface, a user interface of a web application, a user interface of a mobile application) interfacing between the text-to-image diffusion model 112 and a set of client devices 104 (e.g., (distinct) users, applications, or platforms). The system 100 can leverage internal serving infrastructure to concurrently receive and process hundreds or thousands of image generation requests to the text-to-image diffusion model 112 and serve (e.g., output) visual similarity results and matching visual content to requesting users in near-real time (e.g., within seconds). Once trained, the system 100 can therefore implement, leverage, and/or execute the text-to-image diffusion model 112 as part of an image generation platform that enables users to generate custom, high-quality images that align with (text) descriptions, image style selections, and other preferences within seconds.

Generally, communication interface 122 connects the server system 102 to client device(s) 104 that are running a user application, such as software layer application 124. For example, client device(s) 104 may be external to (e.g., remote from) server system 102. Specifically, the communication interface 122 is configured to: receive and process external (e.g., user) requests to generate images via the text-to-image diffusion model 112; transmit a text prompt (e.g., included in the request) to the text-to-image diffusion model 112; and output and/or serve images generated by the text-to-image diffusion model 112 to a client device that submitted the request. In implementations, the communication interface 122 defines a set of communication endpoints, each of which interface between the text-to-image diffusion model 112 and a distinct user, client device, application, platform, and/or project, thereby enabling the system to receive, process, and serve results for image generation requests submitted by multiple (unrelated) users in parallel.

Generally, the system 100 includes a network, such as one or more machine learning, artificial intelligence, and/or deep learning networks, defining a text-to-image diffusion model 112. As shown in FIG. 1, the architecture of the text-to-image diffusion model 112 includes: a set of pre-trained text encoders 118 to interpret a text query; a base image diffusion model 120 configured to generate a base image (e.g., an initial, low-resolution image) based on outputs of the set of pre-trained text encoders 118; and a set of high-resolution diffusion models 116 configured to progressively upsample images generated by the base image diffusion model 120 to larger sizes and/or resolutions.

Generally, each pre-trained text encoder 118 defines a model, such as a (large) language model, that is configured to generate embeddings (e.g., a set of vectors) that encode semantic concepts represented by text from a high dimensional vector space into a latent space. The set of pre-trained text encoders 118 can include text-only language models (e.g., T5-XXL, BERT) and multi-modal language models (e.g., CLIP). The different models may add different understanding of the text prompt, which improves the embeddings. During training and/or operation, the text-to-image diffusion model 112 can execute each pre-trained text encoder 118 on a given text to generate (multiple) embeddings in different embedding spaces, thereby enabling the system to: (1) perform random dropout on these multiple embeddings to increase the generalizability of the language understanding for text-to-image diffusion models 112; and (2) input text embeddings from different text encoders 118 to separate high-resolution diffusion models 116 and operation to condition these models 116 on different embedding representations and/or incorporate additional text information into the upsampling process. In implementations, each text encoder 118 is configured to encode visual information on the appearance of letters, words, and/or phrases by exposing the text encoder 118 to this visual information during training, thereby substantially improving the capabilities of text-to-image diffusion model 112 in rendering visual text (e.g., with correct character formation, spelling, etc.) when generating images based on embeddings generated by the set of text encoders 118.

During pre-training and/or training stages, the system can execute the multi-modal encoder-decoder 126 on text prompts included in the training corpus to generate embeddings used by the text-to-image diffusion model 112 to generate images (e.g., in addition to embeddings generated by the pre-trained text encoder 118, instead of embeddings generated by the pre-trained text encoder 118 or via a dropout method). In some implementations, a multimodal encoder-decoder 126 includes and/or interfaces with a vision transformer configured to divide an input image into segments and generate a corresponding sequence of embeddings for the input image. The multimodal encoder-decoder 126 can operate in different ways, such as: (1) as a unimodal encoder that generates image embeddings given an image input and generates text embeddings given a text input (e.g., generates separate image and text embeddings); (2) as an image-aware text encoder that modifies embeddings generated by the pre-trained text encoder and/or unimodal encoder module to include visual information based on visual features of an input image (e.g., via cross-attention to the input image); and (3) as an image-aware text decoder that generates a text (e.g., natural language) description of an input image based on image-text embedding representations. Generally, the image-aware text encoder and the image aware text decoder can share a common architecture and/or parameters (e.g., with the exception of the cross-attention and self-attention layers) in order to improve training efficiency.

As described below, the system 100 can additionally or alternatively execute the multi-modal encoder-decoder 126 on images in the training corpus to generate high-fidelity text captions for (e.g., descriptions of) images accessed by the web intelligence engine 108 that have missing or inaccurate/misaligned alternate text, thereby improving the vision-language understanding once trained on captioned images of text-to-image diffusion model 112.

In some implementations, the base image diffusion model 120 defines a deep learning network (e.g., a convolutional neural network, a residual neural network, etc.) configured (e.g., through the training described) to generate images from random (e.g., Gaussian) noise based on text prompts and/or descriptions. The base image diffusion model 120 can include a U-net architecture (e.g., Efficient U-Net) defined from residual and multi-head attention blocks that enable the base image diffusion model 120 to progressively denoise (e.g., infill, generate, augment) image data according to cross-attention inputs based on the text prompt. The base image diffusion model 120 can therefore: receive one or more text embeddings from the set of pre-trained text encoders 118; receive and/or initialize a (randomly sampled) noise distribution at a preset resolution (e.g., 64 pixels by 64 pixels); and transform the noise distribution into a base image at the preset resolution based on the one or more text embeddings and parameters, weights, and/or paths corresponding to an iterative denoising process learned by the base image diffusion model 120 during training. The system can then pass the base image to the set of high-resolution diffusion models 116 for upsampling and output.

In some implementations, each high-resolution diffusion model 116 in the set of high-resolution diffusion models 116 defines a deep learning network configured to receive a low-resolution base image (e.g., 64 pixels by 64 pixels, 256 pixels by 256 pixels) and generate a higher-resolution version (e.g., copy) of the base image (e.g., 256 pixels by 256 pixels, 1024 pixels by 1024 pixels). Generally, a high-resolution version shares a similar architecture with the base image diffusion (e.g., U-net, efficient U-net). However, self-attention layers in the base diffusion model architecture can be omitted to improve memory efficiency and inference time. During training, the set of high-resolution diffusion models 116 can be conditioned on text information (e.g., text descriptions of training images), noise augmentations, and/or visual information (e.g., embeddings of low-resolution images generated by the multimodal encoder-decoder). Thus, during operation, each high-resolution diffusion model 116 can implement an iterative denoising process similar to the base image diffusion model 120 in order to progressively upsample generated base images to higher resolution, infill, infer, and/or generate additional visual detail and/or texture, and remove visual artifacts generated by the base image diffusion model 120. As discussed above, high-resolution diffusion models 116 operate in the pixel space to upsample the base images output by base image diffusion models 120.

During operation (e.g., following pre-training and training stages described below), the text-to-image diffusion model 112 is therefore configured to: receive a text prompt (e.g., image description) from the communication interface 122; execute the set of pre-trained text encoders 118 on the text prompt to generate one or more embedding representations; generate a base image based on the one or more embedding representations and image generation parameters of the base image diffusion model 120; sequentially execute the set of high-resolution diffusion models 116 to generate a final image by upsampling the base image to a final resolution; and output the final image (e.g., to the communication interface 122).

Training

Images are needed for training of text-to-image diffusion model 112. In some implementations, web intelligence engine 108 defines a set of software modules configured to retrieve content, such as by executing web crawling algorithms to locate, access, collect, and/or store images and associated alternate text from web pages. Starting from an initial set of (e.g., random) seed resource locators (e.g., URLS), the web intelligence engine 108 can automatically (e.g., without further user input or instruction): analyze webpage contents (e.g., via text or HTML descriptions) to identify and locate any images hosted on each webpage; fetch, download and/or scrape hosted image content; identify, download, and/or generate alternate text (e.g., captions) associated with each accessed image; and identify and follow hyperlinks to other webpages. The web intelligence engine 108 can continuously repeat this process throughout operation of the system in order to find and access previously un-crawled pages, fetch additional images and associated alternate text, and re-crawl previously accessed pages for new images.

By continuously crawling, ingesting, and indexing additional content, the web intelligence engine 108 can assemble a comprehensive repository of web images (e.g., billions of images, tens of billions of images) and associated text for use in training the text-to-image diffusion model 112. The system can thereby assemble and continuously update a web-scale set of images and associated alternate text that can be used to pre-train, train, and/or retrain the text-to-image diffusion model 112 at a subsequent time, thereby increasing the size and diversity of training data. The following will describe different models that can be used to process content.

The images retrieved by web intelligence engine 108 may be processed by models 106 to improve the training process. The composition of the training set may be important to train text-to-image diffusion model 112. If text-to-image diffusion model 112 is trained on images that may have undesirable content, such as watermarks, visual aesthetics, text aesthetics, nudity, blood, text overlay, text-to-image diffusion model 112 may generate images that may include undesirable content. In some implementations, a visual aesthetics model is configured to generate a quality score for an input image based on visual characteristics of an input image, such as the input image's resolution, size, contrast, composition, exposure, etc. For example, the visual aesthetics model can be a deep learning visual classifier trained on aggregated (human) judgments of image quality (e.g., labeled training data). Given an input image, the visual aesthetics model can generate a quality score based on visual features of the input image and correlations between these visual features and human judgments (e.g., labels) within an embedding space derived through model training objectives. The system can therefore execute the visual aesthetics model on images accessed by the web intelligence engine 108 and/or stored in the training corpus in order to identify, remove, and/or exclude images of poor visual quality, thereby increasing the quality of image data used to train to the text-to-image diffusion model 112 and enabling the text-to-image diffusion model 112 to generate images of increased quality and aesthetic appeal when the training data includes greater proportion of high-quality images.

In some implementations, a watermark detection model is configured to classify images as containing overlay content, such as logos, watermarks, and similar digital overlays. Overlay content may be content that is added to main content, such as a video. More specifically, the watermark detection model includes a pre-trained deep learning network (e.g., a deep vision classifier, a convolutional neural network, or a residual learning network such as ResNet) or other suitable machine learning model trained on aggregated (human) judgments of image contents. For example, the watermark detection model can be a visual classifier trained on a large set of images (e.g., thousands of images, millions of images) that include human-generated labels specifying whether the image contains a visible watermark (e.g., a logo or graphic identifying ownership of the image) or similar digital overlay. By executing the watermark detection model on this training set through suitable training techniques, the watermark detection model is configured to identify (e.g., via a confidence score or similar output) images as containing or not containing a digital watermark. As described in more detail below, the system can therefore execute and/or access outputs of the watermark detection model on images in order to identify, remove, and/or exclude images containing digital watermarks or similar overlays from the set of images used in training the text-to-image diffusion model 112, thereby substantially reducing (or eliminating) the likelihood that the text-to-image diffusion model 112 will inadvertently reproduce similar digital watermarks within images it generates during operation.

A set of (pre-trained) content moderation models is configured to classify and reject natural language requests to generate inappropriate content, such as sexually explicit, violent, or otherwise inappropriate content and/or classify and filter out any similarly inappropriate images generated by the text-to-image diffusion model 112.

In some implementations, described in U.S. patent application Ser. No. 17/544,615, the set of content moderation models includes a multi-headed deep learning text classifier (hereinafter the "text classifier") that is trained and/or configured to identify sexually explicit, hateful, and/or violent text prompts based on the semantic meaning of natural language prompts provided to the text-to-image diffusion model 112. For example, given a text input, the text classifier can generate a severity score for each supported class of inappropriate content based on overall semantic meaning of the text input (and/or the presence of specific words or phrases) and various training criteria of the text classifier. As described in more detail below, the system can therefore execute the content moderation model on natural language prompts submitted to the text-to-image diffusion model 112, identify requests to generate sexually explicit, violent, hateful, or otherwise inappropriate content based on severity scores generated by the text classifier, and prevent the text-to-image diffusion model 112 from generating images based on such queries.

In some implementations, also described in U.S. patent application Ser. No. 17/544,615, the set of content moderation models includes a multi-headed visual classifier configured defining a set of deep learning networks pre-trained on a (large) set of labeled images to identify specific types of sensitive, inappropriate, and/or harmful visual content in photographs, animated images, generated images, and video. More specifically, the content moderation model can include a first visual classifier (e.g., a first model head) within the content moderation model that is trained to identify, detect, and/or flag sexually explicit content such as nudity and pornographic material, a second visual classifier (e.g., a second model head) within the content moderation model that is trained to identify violent subject matter such as gore or weapons, and so on. Given an input image and/or video, the visual classifier can compute, derive, and/or generate a set of confidence scores across all supported classes of visual content based on visual features of the input image and training criteria of each classifier head.

As described in more detail below, the system can therefore execute the set of content moderation models on images generated by the text-to-image diffusion model 112, identify inappropriate or unsafe images based on confidence scores generated by the content moderation model and prevent such images from being returned to the end user. By executing and/or recruiting highly accurate, pre-trained content moderation models on text prompts submitted to the text-to-image diffusion model 112 and/or images generated by the text-to-image diffusion model 112, the system can substantially reduce the risk of generating harmful or inappropriate images while reducing the reducing the proportion of false positives that would otherwise be flagged by less accurate zero-shot multi-modal classifier frameworks.

A reward model 114 that is pre-trained on aggregated human assessments of quality and preferability for images created by the text-to-image diffusion model 112. During the training and/or fine-tuning stages, the system can modify and/or optimize parameters of the text-to-image diffusion model 112 using the reward model 114 to train the text-to-image diffusion model 112 to account for human preferences and/or feedback on aesthetic quality, fidelity of a generated image to the corresponding text prompt, and other metrics (e.g., as learned by the reward model 114 during training). The incorporation of human preferences may improve the image generation by generating images that may be more aesthetically pleasing to human users that request the image generation.

In some implementations, the reward model 114 is trained based on human-labeled images generated by an initial text-to-image diffusion model 112. This preference training set can be generated sampling a large set of (diverse) text prompts (e.g., thousands of prompts, millions of prompts) and then, after pre-training an initial text-to-image diffusion model 112, executing the text-to-image diffusion model 112 on each sampled text prompt to generate a corresponding image and storing each resulting prompt-image pair. These prompt-image pairs can then be provided to human annotators instructed to score and/or rank images generated by the text-to-image diffusion model 112. In one example, human annotators can be asked to evaluate a text prompt and give a numerical (e.g., scalar) score for the corresponding image based on (subjective) aesthetic appeal of the image (e.g., visual appeal based on color scheme, composition, texture etc., convincing visual perspective, creativity, photorealism). Human annotators may also be asked to consider fidelity to (e.g., alignment between) the image and the corresponding text prompt—including correct subjects, correct spatial orientation, and/or consistency with any stylistic constraints specified in the text prompt—when determining a score for the generated image. Additionally, human annotators may be asked to automatically assign a low (or the lowest) numerical score to images that contain inappropriate or harmful visual content.

In another example, the human annotators may be asked to perform a head-to-head comparison between images generated by different image generation models (e.g., DALLE-2, Midjourney, IMAGEN, etc.) using the same text prompt compared to the output of text-to-image diffusion model 112. In this example, human annotators may be asked to rank images generated by each image generation model in order of preference or with respect to the above criteria. The relative ranking of the image generated by the initial text-to-image diffusion model 112 (or a numerical value calculated on these rankings, such as an Elo score) can then be used as a preference score associated with image. The system can then store the resulting preference training set—including images generated by the initial text-to-image diffusion model 112 labeled with corresponding preference scores in the set of storage devices no.

Once assembled, the system 100 can then execute the (untrained) reward model 114 on the preference training set, enabling the reward model 114 to automatically derive correlations between visual features of images generated by the text-to-image diffusion model 112 and preference scores produced by human annotators. During training, the reward model 114 can automatically and progressively modify, update, and optimize its weights, parameters and/or paths based on analysis of each image-score pair in the preference training set in order to learn human aesthetic preferences for generated images. Once trained, the reward model 114 can then analyze an image (e.g., an image generated by the text-to-image diffusion model 112) and compute a reward score that aligns with (e.g., is similar to, highly correlated with) human aesthetic preferences for generated images. As described in more detail below, the system can therefore leverage the reward model 114 (e.g., preference scores generated by the reward model 114) to update, optimize, and/or fine-tune parameters of the text-to-image diffusion model 112 during the training stage(s) to incorporate (simulated) human feedback into the text-to-image diffusion model 112's training objectives.

Figure 2:
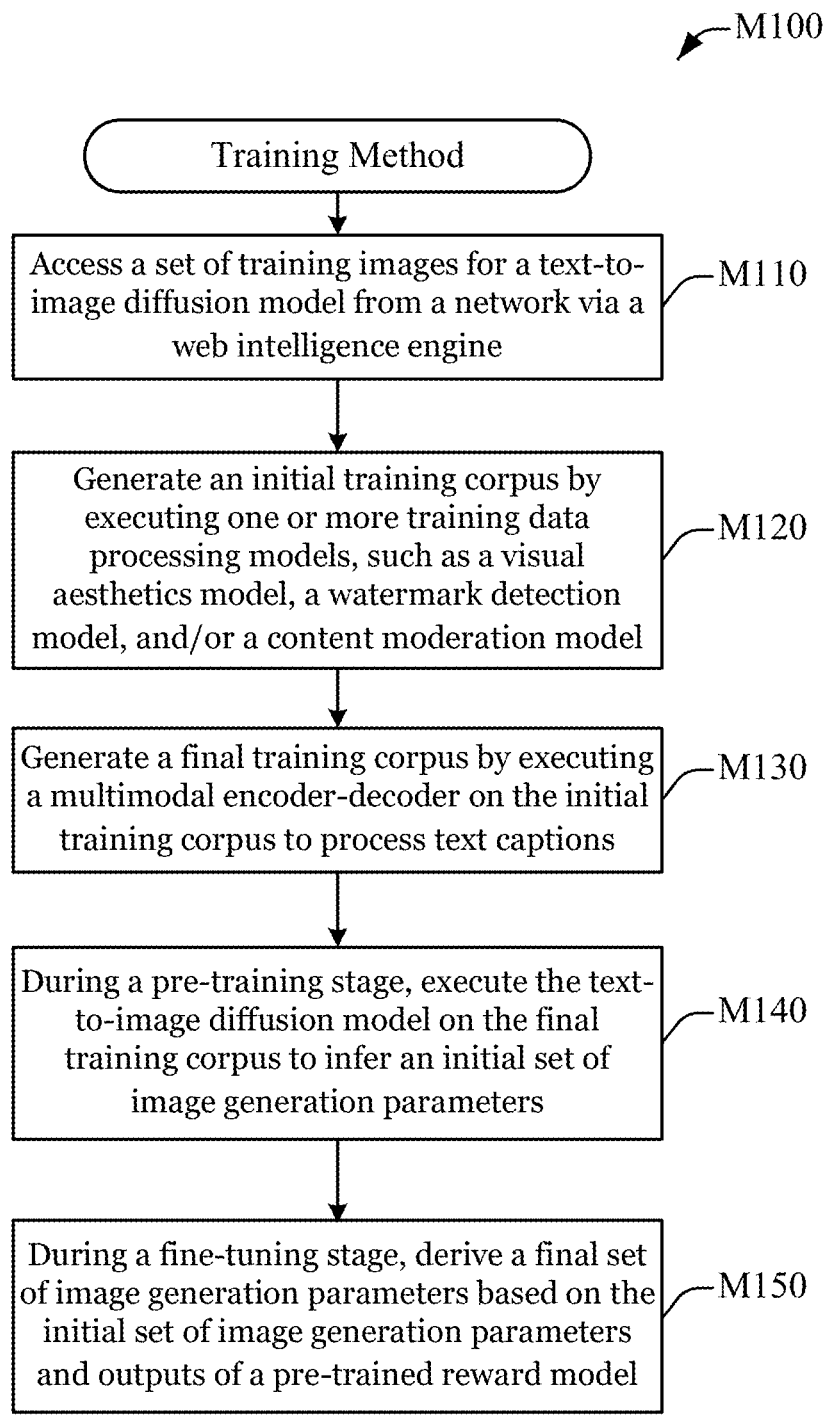
FIG. 2 depicts a method for training text-to-image diffusion model according to some embodiments.

FIG. 2 depicts a method M100 for training text-to-image diffusion model 112 according to some embodiments. The method M100 and its variations can therefore be implemented by a computing system, such as a local, distributed, and/or cloud-based computing system, to: access, create, aggregate, large sets of text-image pairs (e.g., millions of images, billions of images) from the Internet and/or network sources and then implement computer vision and deep learning techniques to create a comprehensive training corpus for a text-to-image diffusion model 112 from this otherwise noisy and/or unstructured web data. More specifically, the system can execute a set of visual classifiers on image data accessed by a web intelligence engine 108 (e.g., a set of custom web crawler modules) to identify and remove and/or exclude undesirable images—such as low-resolution or otherwise visually unappealing images, images that contain watermarks or digital overlays, or images that include harmful or explicit content—from the set of training data to improve the training process. The system can then execute filter and captioner modules to generate highly accurate synthetic text descriptions of (remaining) training images. By executing Blocks of the method M100, the system can therefore automatically source, select, and label (e.g., with synthetic captions) a set of high-quality example images that (far) exceeds the size of publicly and/or commercially available datasets that are conventionally used for image generation tasks without relying on prohibitively costly human sourcing and annotation.

The method M100 and its variations are described herein as being implemented by a distributed computer network in conjunction with a text-to-image diffusion model 112 and one or more indexes of training images. However, these methods can also be implemented by a local computer system, a peer-to-peer computing network, a cloud computing system, or any other computer architecture suitable to pre-train and/or fine-tune a deep learning network or other suitable machine learning model, process user requests to query the deep learning network, and synchronously return and/or serve model outputs in response to these requests.

At Block M110, the system accesses a set of training images for a text-to-image diffusion model 112, where a first subset of the set of training images includes images retrieved from a network via a web intelligence engine 108. As described above, the system is generally configured to execute the web intelligence engine 108 to access, retrieve and/or download image data (and associated alternate) from public networks such as the internet, or from private (e.g., internal) networks and store this image data and/or embedding representations of this image data in the set of storage devices in order to aggregate a web-scale set of images for use in training the text-to-image diffusion model 112. By accessing a large volume of (random) images from a variety of internet sources (e.g., millions of images, billions of images), the system can assemble a highly diverse set of training images that includes examples of nearly all visual subject matter and image styles (e.g., photorealistic images, animated images, images in the style of particular artists, and other aesthetic characteristics). Additionally or alternatively, the set of training images can be supplemented by and/or include images from one or more open-source, commercial, and/or academic datasets for use in training or evaluating image generation models (e.g., LAION, COCO, and/or ImageNet).

At Block M120, the method generates an initial training corpus by executing one or more models 106, such as a visual aesthetics model, a watermark detection model, and/or a content moderation model, on the set of training images and removing a second subset of training images from the set of training images based on outputs of the one or models 106. In particular, the system can pre-process, filter, and/or sort the set of images (e.g., images accessed by the web intelligence engine 108) based on outputs of the visual aesthetics model and/or the watermark detection model in order to remove or exclude low-quality images from the set used to train the text-to-image diffusion model 112. For example, the system can execute the visual aesthetics model and/or the watermark detection model on images (e.g., each image) accessed and downloaded by the web intelligence engine 108 before these images are added to the corpus training images. More specifically, for each web image accessed by the web intelligence engine 108, the system can: execute the visual aesthetics model on the web image to generate a quality score based on visual features of the web image; and in response to the quality score meeting (e.g., exceeding) a pre-determined visual quality threshold, store the web image within the corpus of training images. Alternatively, in response to the quality score not meeting (e.g., falling below) the visual quality threshold, the system can either (i) discard the web image or (ii) store the web image separately from the corpus of training images (e.g., in a separate, more general index of web images not used to train the text-to-image diffusion model 112). In another example, the system 100 can first assemble the set of training images via the web intelligence engine 108 and execute the visual aesthetics model on each training image to identify images that do not meet the pre-determined visual quality threshold. The system can then delete and/or remove any images that do not meet the pre-determined visual quality threshold from the set of training images. Thus, the system 100 can leverage the visual aesthetics model to screen training images, and specifically images retrieved by the web intelligence engine 108, for visually unappealing (e.g., low-quality) images—such as low-resolution images or images with poor saturation and/or coloring, composition, or contrast—thereby increasing the overall visual quality of images eventually used to train the text-to-image diffusion model 112 and improve the aesthetic appeal of images generated by the text-to-image diffusion model 112 during operation.

Similarly, in some implementations, the system can leverage the watermark detection model to identify and remove images that include visible digital overlays/signatures from the corpus of training images. As described above with the respect to the visual aesthetics model, the system 100 can execute the watermark detection model on images as they are retrieved by the web intelligence engine 108 and/or after the corpus of training images has been assembled. In particular, for each image accessed by the web intelligence engine 108 and/or included in the corpus of training images, the system 100 can execute the watermark detection model on the image to generate, compute, and/or derive a confidence score representing and/or correlated with a probability that the image includes a digital watermark based on visual features of the image. In response to a confidence score meeting (e.g., exceeding) a pre-determined confidence threshold, the system can: (i) discard the corresponding image (e.g., decline to store the image, accessed by the web intelligence engine 108) in the corpus of training images; or (ii) remove and/or delete the corresponding image from the initial corpus of training images. The system, in conjunction with the watermark detection model, can therefore screen images accessed by the web intelligence engine 108 and/or included in the training corpus for images with undesirable digital overlays or watermarks and exclude such images from the data used to train the text-to-image diffusion model 112, thereby reducing (or eliminating) the likelihood that the text-to-image diffusion model 112 will inadvertently generate images with (artifacts of) similar watermarks during operation and increasing overall quality of generated images.

In implementations, the system 100 can also execute similar methods using the set of content moderation models (e.g., the multi-headed visual classifier) in order to screen images accessed by the web intelligence for inappropriate, harmful, or undesirable visual subject matter—such as sexually explicit content, gore, violence, etc.—and exclude or remove such images from the training corpus, thereby substantially reducing (or eliminating) the likelihood that the text-to-image diffusion model 112 will inadvertently generate images with similar characteristics even if provided with inappropriate text prompts.

Thus, the system 100 can execute any and all of the above to create an initial training corpus that includes a number, such as millions (or billions or more), of web images screened according to outputs of the visual aesthetics model, the watermark detection model, and/or the visual content moderation model to improve overall visual quality of images (eventually) used to train the text-to-image diffusion model 112 and/or avoid exposing the text-to-image diffusion model 112 to harmful, hateful, or explicit content, which may degrade the image generation.

At Block M130, the method generates a final training corpus by executing a multimodal encoder-decoder 126 on the initial training corpus to process text captions, such as to (i) generate text captions describing each image in the set of training images and (ii) identify and remove misaligned text captions associated with images in initial training corpus. As described above, the text-to-image diffusion model 112 can include and/or interface with a multimodal encoder-decoder 126 that is configured to both generate a visual feature embedding of input images in a text-image embedding space (e.g., a high dimensional abstract vector space) and decode visual feature embeddings into a natural language (e.g., text) description of corresponding images. By executing the multimodal encoder-decoder 126 on web images and/or image-alternate-text pairs accessed by the web intelligence engine 108, the system can automatically infer, generate, and/or bootstrap high-fidelity text captions for images (e.g., images without associated alternate text) retrieved by the web intelligence engine 108 and identify and correct noisy, incorrect and/or mismatched image-alternate-text pairs retrieved by the web intelligence engine 108 in order to create a large set of instructive text-image training examples (e.g., millions of training pairs, billions of training pairs) using web data without human labeling or annotation. The system can then store the modified training corpus for use in pre-training, conditioning, and/or training one or more text encoders 118 or base image diffusion model 120 of text-to-image diffusion model 112 and/or a new multimodal encoder-decoder module in order to improve the text-to-image diffusion model 112 performance in downstream generation tasks.

More specifically, in some implementations, the system is configured to execute a filter module (e.g., an image-aware text encoder) of the multimodal encoder-decoder 126 on the initial training corpus in order to generate a multimodal embedding (e.g., a feature vector) representing image-alternate-text pairs (e.g., each pair in the training corpus). The filter module can then identify captions (e.g., alternate text) in the training corpus that are misaligned with (e.g., do not match or describe) images they correspond with using image-text matching loss or another suitable objective and remove, discard, or delete the misaligned caption. The system can then execute a captioner module initialized from the image-aware text decoder in the multimodal encoder-decoder to generate a synthetic caption for any image-only training examples remaining in the training corpus (e.g., images without associated alternate text, images where the filter module has removed mismatched alternate text) based on language modeling loss, cross-entropy loss, or another suitable objective. For example, if an image of the Eiffel Tower is accessed from a travel blog with the alternate text that reads "my day in Paris," the system can detect a mismatch between the alternate text and the visual content of the image based on the outputs of by the image-aware text encoder (e.g., embedding representations of the image and/or alternate text). The filter module can then remove, discard, and/or delete the mismatched alternate text. Then, the system can execute the captioner module (e.g., including the image-aware text decoder) on the image and/or embedding of the image to infer, generate, and/or synthesize a more descriptive caption that semantically aligns with the image contents, such as "street-level photograph of the Eiffel Tower on a sunny day." In another implementation, the system can first execute the captioner module on the training corpus and then execute the filter module on the resulting training set in order to remove image-text pairs that include either misaligned alternate text or misaligned (e.g., inaccurate) synthetic captions generated by the captioner module, thereby increasing overall caption fidelity of the training corpus but yielding a (slightly) smaller set of training examples.

By executing the captioner and filter modules across a corpus of training images accessed by the web intelligence engine 108, the system can accurately identify mismatched image-alternate text pairs and replace the alternate text with high-fidelity captions generated by the multimodal encoder-decoder in order to pre-train and/or train the text-to-image diffusion model 112 on large volumes of otherwise noisy web data (e.g., millions of training examples, billions of training examples) without relying on (prohibitively expensive) human annotation to generate or correct captions for these training images, thereby substantially increasing the text-to-image diffusion model 112's vision-language understanding during training for downstream image generation tasks. Also, the system 100 can train multiple low-rank approximation models (LoRA) on various domains of images such as: cars, outer space, nature, animals. Then, the system 100 trains a classifier to decide which LoRA (or mixture of LoRAs) is the best to generate each particular input prompt. This mixture of experts maintains image fidelity across many different domains like animated and photorealistic images.

At Block M140, during a pre-training stage, the method executes the text-to-image diffusion model 112 on the final training corpus to infer an initial set of image generation parameters. Generally, the text-to-image diffusion model 112 can be initialized with (a subset of) parameters of the multimodal encoder decoder 126 to condition the base image diffusion model 120 for vision-language tasks (e.g., to transfer vision-understanding learned by the multimodal encoder-decoder 126 during training and/or through filtering and captioning the initial training corpus). During pre-training, the system 100 can execute the set of pre-trained text encoders 118 on captions within the modified training corpus to generate one or more text embeddings (e.g., vector representations) of captions associated with each training image. More specifically, for each text caption in the modified training corpus, the system can: execute a first pre-trained text encoder in the set of pre-trained text encoders 118 (e.g., selected from one of: the unimodal encoder of the multimodal encoder-decoder, a pre-trained large language model such as T5, CLIP, BERT, etc.) on a text prompt to generate a first corresponding text embedding in a first embedding space; execute a second pre-trained text encoder in the set of pre-trained text encoders 118 on the text caption to generate a second corresponding text embedding in a second embedding space different from the first embedding space. The system can then store and/or queue the set of text embeddings associated with each image in the modified training corpus in order to condition the base image diffusion model 120 on these different text embeddings (e.g., representations) during pre-training.

The system 100 can then execute the text-to-image diffusion model 112 on images within the modified training corpus to train the base image diffusion model 120. Generally, during pre-training, the system can iteratively add or inject noise (e.g., Gaussian blur) to training images and execute the base image diffusion model 120 on (or otherwise expose the image model to) each step in this iterative noising process with a training objective to reverse this noising process in a way that maximizes the likelihood of recovering the initial training image(s). Thus, the base image diffusion model 120 can sample and parameterize each step of this iterative noising process in order to infer weights, parameters, and/or paths for reversing each noising iteration back towards the initial distribution (e.g., the unmodified training image). During the iterative noising and/or denoising processes, the system 100 can also inject timestep information into embedding representations of training images (e.g., via a timestep encoding vector) in order to condition the base image diffusion on representations of the (re)generated image at each timestep.

During pre-training, the system 100 can also condition the base image diffusion model 120 on text embeddings generated by the set of pre-trained text encoders 118 in order to train the base image diffusion model 120 to semantically correlate visual features of images in the modified training corpus with the description of the image in the corresponding text caption. More specifically, the system 100 can pool embeddings (e.g., output vectors) generated by a pre-trained text encoder and insert the resulting text encoding into the timestep embedding described above. The system 100 can then implement cross-attention techniques to condition the base image diffusion model 120 on the combined image, time, and text embedding, thereby enabling the base image diffusion model 120 to learn correlations and/or relationships between a training image the corresponding text captions. In some implementations, the system 100 is configured to perform random dropout on one or more of the embedding representations generated by the set of pre-trained text encoders 118. For example, if the set of pre-trained text encoders 118 includes two different encoders, a subset of the modified training corpus may be used to condition the base image diffusion on only embeddings generated by only one of these encoders (or unconditionally) in order to reduce the reliance of base image diffusion model 120 on any single embedding representation and increase generalizability of the model's text understanding, thereby improving the model's ability to interpret and adhere to text prompts (e.g., provided by users) during operation.

By repeating these training steps over the entire modified training corpus, the base image diffusion model 120 can automatically infer, derive, and/or produce a set of initial weights, parameters, and/or paths within the model architecture that therefore enable the base image diffusion model 120 to transform randomly sampled noise into a base image that is semantically aligned with an input text prompt.

In some implementations, the set of high-resolution diffusion models 116 defines one or more deep learning networks (e.g., convolutional neural networks, residual learning networks) trained similarly to the methods described above with respect to the base diffusion model. Additionally, each high-resolution diffusion model 116 can be trained via noise conditioning augmentation to iteratively transform the base image into a larger and/or higher resolution version (e.g., 256 pixels by 256 pixels, 1024 pixels by 1024 pixels) by infilling and/or inferring pixel values in order to increase the level of image detail, add and/or preserve texture, and remove any artifacts generated by the base image diffusion model 120. In particular, each high-resolution diffusion model can be trained on a (large) set of low-resolution (e.g., 64 pixel by 64 pixel) images, each of which is augmented with a (random) level of noise (e.g., Gaussian blur). During training, the system can quantify the degree of augmentation applied to each training image (e.g., as a decimal value between 0 and 1) and expose (e.g., provide) the augmentation level to the model in order to condition each high-resolution diffusion model 116 on these noise augmentations. Additionally, each high-resolution diffusion model 116 can be conditioned on text data (e.g., an embedding representation of a text description of a training image) similar to the text condition method described above with respect to the base image diffusion model 120. For example, the system can perform random dropout on certain text embeddings generated by the set of pre-trained text encoders 118 or separately condition each high-resolution diffusion model on outputs of different text encoders 118 (e.g., condition a first high-resolution diffusion model using embeddings generated by a CLIP text encoder, condition a second high-resolution diffusion model using embeddings generated by the multimodal encoder-decoder 126 operating as an image aware text encoder, and so on). Thus, the system can also expose the high-resolution diffusion model(s) 116 to text information during training in order to preserve and/or increase text-alignment as each model high-resolution diffusion model 116 upsamples low-resolution base images generated by the base image diffusion (e.g., via cross attention to the text prompt received with the image generation request).

At Block M15o, during a fine-tuning stage, succeeding the pre-training stage, the method derives a final set of image generation parameters based on the initial set of image generation parameters and the outputs of a pre-trained reward model 114. As described above, the system 100 includes a reward model 114 trained to generate a reward value (e.g., a numerical score correlated with human aesthetic preferences for generated images learned during training) given an image generated by the text-to-image diffusion model 112 (e.g., after the pre-training stage). The system can therefore leverage the reward model 114 when fine-tuning some or all parameters of the base image diffusion model 120 (and the high-resolution diffusion models 116) in order to bias the model towards generating images that are more likely to align with human aesthetic preferences and/or human expectations of alignment between the text prompt and the generated image.

During the fine-tuning phase, the system 100 can initialize a copy of the text-to-image diffusion model 112 with the initial set of image generation parameters (e.g., a "policy") that describe and/or control means and variances of a noise level at each pixel at each diffusion step. In some implementations, for each text prompt in a fine-tuning set, the system 100 can execute a reinforcement learning algorithm to: input the text prompt to the (pre-trained) text-to-image diffusion model 112 to generate a first image; input the text prompt to the copy of the text-to-image diffusion model 112 to generate a second image; input the first image and the second image to the reward model 114; compute a preferability score for the second image based on a difference between a first reward value output by the reward model 114 for the first image and a second reward value output by the reward model 114 for the second image. Following a sequence of these actions, the system can then pass a parameter update to the policy that describes a sequence of per pixel noise means and variances that increases and/or maximizes the cumulative reward (e.g., a sum of preferability scores) output by the reward model 114. In other implementations, these policy updates can be generated based on reward outputs for pre-generated images without including the corresponding text prompts.

Generally, the system can also modify the preferability score as fine-tuning progresses in order to discourage and/or prevent the tuned text-to-image diffusion model 112 from blindly over-optimizing around outputs of the reward model 114 (e.g., based on KL divergence). For example, the system 100 can subtract a scalar penalty from the preferability score that increases with each parameter update passed to the copy text-to-image diffusion model 112. By repeating this parameter optimization process across the entire fine-tuning set, the system can create a fine-tuned copy of the text-to-image diffusion model 112 with image generation parameters modified from the initial set based on human feedback indicated to the reward model 114 during its training, thereby increasing the aesthetic appeal and prompt fidelity of images generated by the text-to-image diffusion model 112 during operation.

Image Generation Platform

Once trained, the system 100 can execute the text-to-image diffusion model 112 on text prompts received via a communication to generate images based on generation requests made by users (e.g., using a web or mobile application from a client device). Generally, the system 100 can leverage internal serving infrastructure to receive and process image generation requests from a large set of client devices 104 (e.g., sequentially or concurrently process tens or hundreds of image generation requests per second), pass natural language (e.g., text) prompts and/or constraints specified in image generation requests as inputs to the text-to-image diffusion model 112, execute the text-to-image diffusion model 112 to generate images matching the natural language prompts, and route/serve (e.g., output) image generation results to the client device in near real-time (e.g., within seconds)

Figure 3:
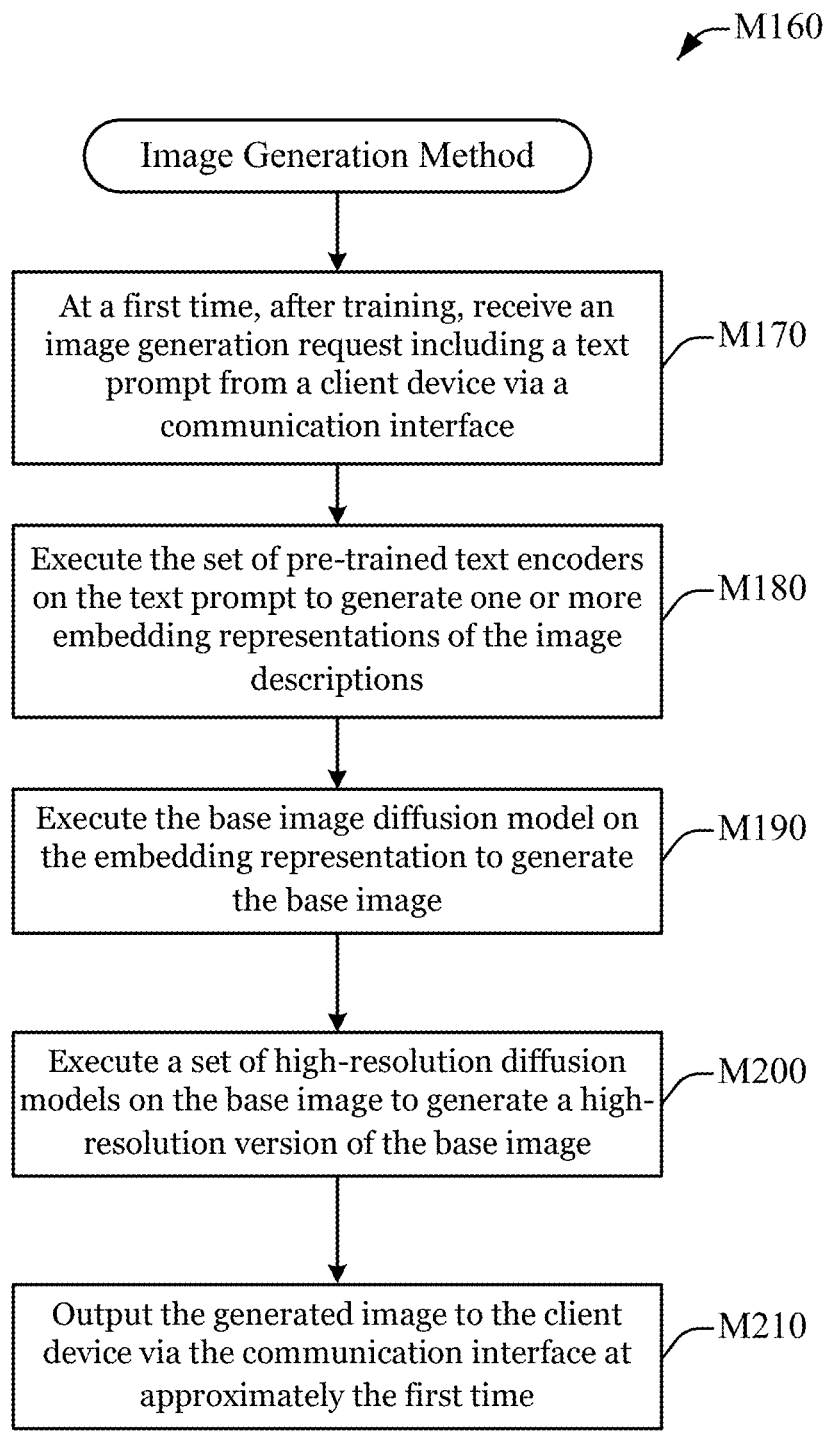
FIG. 3 depicts a simplified flowchart of a method for processing requests and generating image results according to some embodiments.

FIG. 3 depicts a simplified flowchart M160 of a method for processing requests and generating image results according to some embodiments. At a Block M170, at a first time, after training: the method receives an image generation request including a text prompt from a client device via a communication interface 122. The text prompt may include text, such as generate a "warrior". As shown in FIG. 1, the system includes a communication interface 122 that connects, links, and/or interfaces between the text-to-image diffusion model 112 and one or more client (e.g., user) devices 104, applications 124, or platforms. In some implementations, the communication interface 122 defines a (standalone) application programming interface (or "API"). In this implementation, the system is configured to receive the image generation request as a direct API call to an HTTP endpoint specifying (i) a text prompt or audio file and (2) an authentication token. The API call can be made programmatically by a user or automatically in response to events or conditions. The system can then: compare the authentication token to a list of approved users, accounts, and/or projects; and, in accordance with a determination that the image generation request is associated with an authorized endpoint, pass the text prompt as an input to the text-to-image diffusion model 112 through internal serving infrastructure.

In another implementation, the communication interface 122 includes a user-facing software application layer, such as a web or mobile application 124 built on the application programming interface, that enables a user (or set of users) to submit image generation requests to the text-to-image diffusion model 112 via inputs to a user interface.

The method executes the text-to-image diffusion model 112 on the text prompt to generate a synthetic image based on the text prompt and the final set of image generation parameters. In some implementations, the system is configured to route the text prompt included in the image generation request to a text classifier (not shown) prior to inputting the text prompt to the text-to-image diffusion model 112 in order to identify and reject image generation requests for undesired content, such as harmful, explicit, and/or hateful content. More specifically, the system can: execute the text classifier on the text prompt to generate a severity score in each supported text moderation class (e.g., by executing each model head in the text classifier on the text prompt); compare each severity score to a predetermined severity threshold; and, in response to one or more severity scores meeting (e.g., exceeding) the severity threshold, declining the image generation request and returning an error message. The system 100 can therefore leverage the text classifier to screen, filter, and/or reject requests to generate sexually explicit, hateful, obscene, or misleading images in order to enforce content guidelines and prevent abuse of the image generation platform. Alternatively, in response to each severity score not meeting, such as falling below the severity threshold, the system can pass (e.g., route, input) the text prompt as an input to text-to-image diffusion model 112 to proceed with image generation.

Once receiving the text prompt, at Block M180, text-to-image diffusion model 112 can execute the set of pre-trained text encoders 118 on the text prompt to generate one or more embedding representations of the image descriptions. Then, at Block M200, the method can execute the base image diffusion model 120 on the embedding representation to: initialize a random distribution of noise (e.g., Gaussian noise) at the resolution of the base image (e.g., 64 pixels by 64 pixels, 128 pixels by 128 pixels); iteratively (e.g., progressively) denoise the random distribution according to the fine-tuned set of image generation parameters (e.g., parameters learned by the base image diffusion model 120 during training and/or fine-tuning) and a semantic representation of the image description encoded in the one or more embedding representations (e.g., according to outputs of the base image diffusion model 120's cross attention layers). In implementations, the system can also modify the cross attention inputs (e.g., via a coefficient) of text-to-image diffusion model 112 and/or reduce a guidance weight provided to text-to-image diffusion model 112 proportional to the creativity level set at the generation interface (e.g., by the user), thereby reducing or increasing the (required) image-text alignment of base images generated by the base image diffusion model 120 according to user specifications.

Generally, the system may also implement thresholding techniques at each step of this iterative denoising process in order to prevent over-saturation and increase photorealism of base images generated by the base image diffusion model 120. For example, the system can implement a static thresholding process that automatically clips pixel values predicted by the base image diffusion model 120 into the range (e.g., interval) of pixel values observed in training data. Alternatively, the system can implement a dynamic thresholding process whereby, at each step of the iterative denoising process, the system can modify predicted pixel values based on sampling the distribution of predicted values to collapse saturated pixels back towards the middle of the distribution in order to (substantially) reduce the likelihood that base image diffusion model 120 will predict oversaturated pixel values at each step of the iterative denoising process, thereby increasing the photorealism and/or aesthetic appeal of images generated by the text-to-image diffusion model 112 even under large guidance weights.

Text-to-image diffusion model 112 can therefore iteratively transform a randomly sampled noise distribution into a base image (e.g., pixels) aligned with (e.g., matching) the image description and any stylistic constraints indicated in the image generation request according to the diffusion process(es) learned by the base image diffusion model 120 through its analysis of training data and fine-tuning based on human feedback (e.g., via the reward model 114) in near-real time (e.g., within seconds). In implementations, the system 100 is configured to generate multiple (e.g., two, four, or more) images via the text-to-image diffusion model 112 for each image generation request received to enable users to select and use the image that best aligns with their individual preferences. For example, the system 100 can execute the base image diffusion model 120 on each embedding representation of the text prompt generated by the set of pre-trained text encoders 118 (e.g., generate a first image based on a CLIP embedding, generate a second image based on a T5 embedding) to generate additional variations of the requested image arising from differences between the embedding spaces used by each different pre-trained text encoder. Additionally or alternatively, the system 100 can simply execute the base image diffusion model 120 on a single embedding representation of the text prompt multiple (e.g., two or four) times to generate additional variants. In this implementation, the system 100 can also leverage the reward model 114 to rank images (e.g., prior to upscaling, prior to output) according to preferability scores output by the reward model 114. More specifically, the system 100 can execute reward model 114 on each candidate image generated by the text-to-image diffusion model 112 on a particular text prompt (e.g., a set of four image candidates, a set of eight image candidates) to generate a preferability score for each candidate image; rank the set of candidate images in order of preferability score; and select a subset of candidate images (e.g., one candidate image, four candidate images) associated with the highest preferability scores for upsampling and/or output. Thus, in addition to recruiting the reward model 114 during training and/or fine-tuning the reward model 114, the system can also leverage the reward model 114 rank and select images generated by the text-to-image diffusion model 112 in order to increase the aesthetic quality and/or text alignment of images that are ultimately output/served in response to image generation tasks.

In implementations, the system 100 can also execute the multi-headed visual classifier on base images generated by the text-to-image diffusion model 112 (e.g., base images generated by the base image diffusion prior to upscaling and output) in order to screen and/or filter out any explicit, violent, or otherwise harmful/inappropriate images that may be (inadvertently) generated by the text-to-image diffusion model 112 during operation. More specifically, the system can: route a set of base images generated by the base image diffusion to the multi-headed visual classifier (e.g., prior to passing the base image to the set of high-resolution diffusion models 116 for upscaling); execute the multi-headed visual classifier to generate (e.g., compute, derive) a set of confidence scores (e.g., a decimal value between 0 and 1) for each base image, each confidence score representing a probability that the base image contains visual subject matter that falls into a moderated class (e.g., sexually explicit content, blood or gore, hate symbols, etc.); compare each confidence score to a pre-determined visual moderation threshold (e.g., a confidence threshold of 0.9); and, in response to a confidence score in the set of confidence scores meeting (e.g., exceeding) the visual moderation threshold, decline to input the corresponding base image to the set of high-resolution diffusion models 116 and return/output an error message to a user associated with the image generation requested. For example, if each base image generated by the base image diffusion model 120 (e.g., in implementations where the text-to-image diffusion model 112 generates multiple image per image generation request) meets the visual moderation threshold in one or more moderated classes, the system can output the error message in place of any generated image (es). Alternatively, if one or more of the images generated by the base image diffusion model 120 meets visual moderation criteria (e.g., each confidence score falls below the visual moderation threshold), the system can input these base images to the set of high-resolution diffusion models 116 for upscaling and output as described below.

At Block M200, the system may execute a set of high-resolution diffusion models 116 on the base image to generate a high-resolution version of the base image. As described above, the text-to-image diffusion model 112 includes and/or interfaces with a set of high-resolution diffusion models 116 configured (e.g., trained) to upsample and/or upscale base images generated by the base image diffusion model 120 to larger sizes and/or resolutions prior to output.

Once trained, high-resolution diffusion models 116 can sequentially execute each high-resolution diffusion model on low-resolution images generated by the base image diffusion to upscale and/or upsample these images to higher resolution prior to output during operation. In some implementations where the base image diffusion model 120 generates the base image at 64-pixels-by-64-pixels, the text-to-image diffusion model 112 can first input the base image to a first high-resolution diffusion model configured to upsample the base image to 256-pixels-by-256 pixels via an iterative denoising process with text cross attention to the description (e.g., text prompt) provided in the image generation request. The text-to-image diffusion model 112 can then pass the 256×256-pixel image to a second high-resolution diffusion model 116 configured to upsample the 256×256 image to 1024-pixel-by-1024-pixel resolution, and so on. The text-to-image diffusion model 112 can therefore implement multiple, progressive diffusion processes to rapidly generate high-resolution images (e.g., within seconds of receiving the image generation request) with increased photorealism/aesthetic appeal and high fidelity to the image description provided in corresponding text prompts.

At Block M210, the method outputs the generated image to the client device via the communication interface 122 at approximately the first time. The system can serve (e.g., output) a response to the image generation request, including the upscaled image(s) generated by the text-to-image diffusion model 112 to an associated endpoint via the communication interface 122.

Application Interface

Figure 4A:
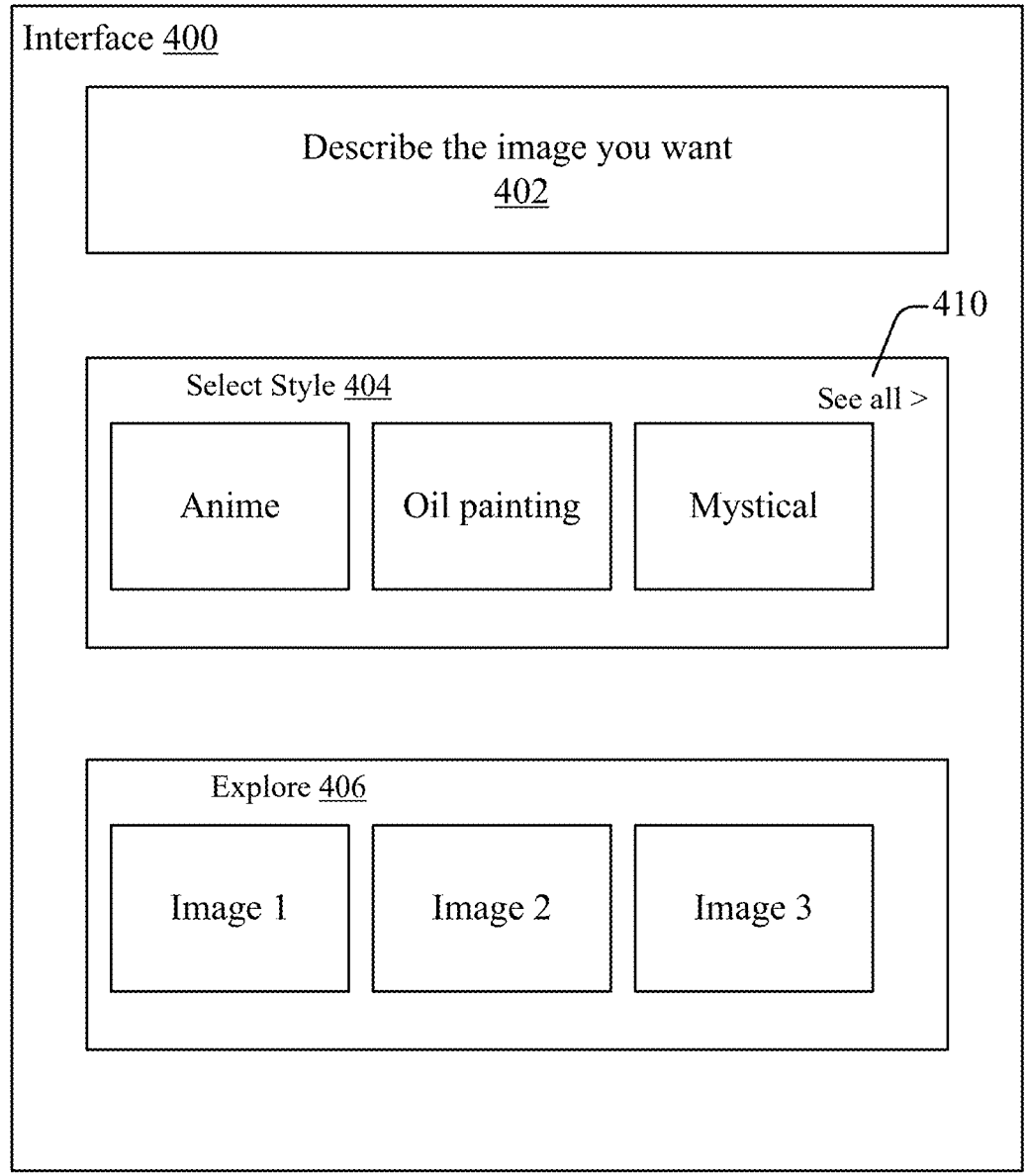
FIG. 4A depicts an example of an interface for inputting an image generation request according to some embodiments.
Figure 4B:
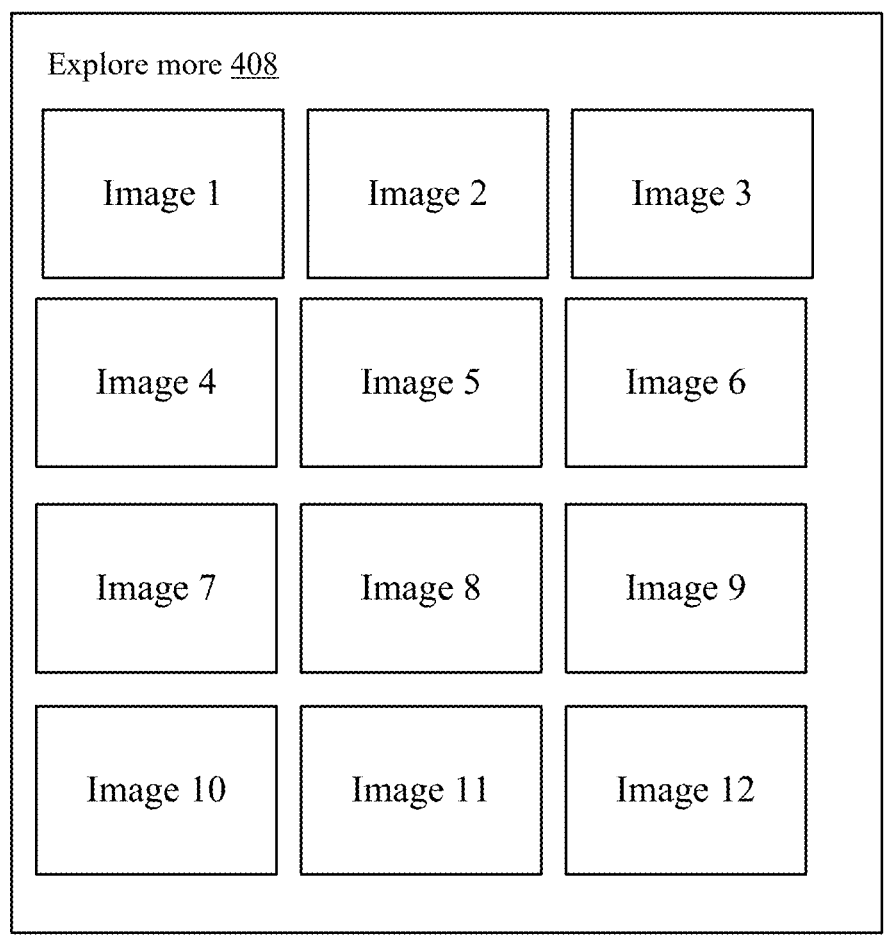
FIG. 4B depicts an example of an overlay tab that can display a larger number of previously generated example images according to some embodiments.

The following describes examples of interfaces that could be displayed on client devices 104 to enable submitting image generation requests and receiving generated images. FIG. 4A depicts an example of an interface 400 for inputting an image generation request according to some embodiments. In the example of FIG. 4A, the software application layer 124 defines computer-readable instructions that, when executed by processors on a client device 104 (e.g., a smartphone, a tablet, a laptop), cause the client device 104 to display a first user interface (or "generation interface") that includes: an interactive text field 402 displayed adjacent to a header prompting the user to enter text; a (scrollable) style menu 404 including a set of (selectable) style icons indicating choices of pre-set image styles (e.g., photorealistic, anime, drawing Van Gogh, etc.); and a "generate" affordance. In the example of FIG. 4A, the generation interface also includes a (scrollable) explore menu 406 enabling the user to browse a selection of images previously generated by the text-to-image diffusion model 112 (e.g., in response to other users' image generation requests) paired with the text prompts that produced those images. In particular, the explore menu can include a set of image tiles, each of which includes a previously generated image and an overlay showing the corresponding text prompt. In response to detecting a horizontal swipe (or scroll) input on a display or trackpad over the explore menu area, the software application layer can transition the explore menu to replace currently displayed image tiles with additional generated images and text prompts. Additionally or alternatively, the software application layer 124 can expand the explore menu in an overlay tab in response to detecting a user input (e.g., a touch input, a click) on an "explore more" affordance (e.g., button, link) located adjacent to the explore menu. FIG. 4B depicts an example of an overlay tab 408 that can display a larger number of previously generated example images according to some embodiments. The images may enable the user to browse these examples more quickly and efficiently (e.g., via vertical swipe or scroll inputs) and/or display these generated images at a larger size or resolution. Thus, the software application layer and explore menu can assist the user in deciding on the type of image they wish to generate and in developing and/or phrasing a corresponding image generation prompt, in order to reduce the cognitive burden on the user in operating the software application and reducing idle time within the web or mobile application, thereby conserving battery on the client device.

Referring back to FIG. 4A, the interactive text field 402 prompts and enables the user to input text that describes an image they wish to generate via the text-to-image diffusion model 112. In the example of a mobile application, the software application layer 124 can cause the client device 104 to display a keyboard overlay near (e.g., beneath) the text box in response to detecting a user input (e.g., an input to a touch screen with a finger or a stylus) on the interactive text field. In the example of FIG. 4A, the generation interface also includes an "inspiration" affordance (e.g., a link or button) adjacent to the text box. In response to detecting a user input selecting the inspiration affordance (e.g., a touch input or click on the inspiration affordance), the software application layer can automatically (e.g., randomly) retrieve a sample text prompt to the user selected from a large set of example prompts and populate the interactive text field with the example prompt, which the user can then edit or remove (e.g., via the device's keyboard) by selecting the interactive text box as described above. Thus, the software application layer 124 and inspiration affordance can assist the user in deciding on a type of image they wish to generate and in developing and/or phrasing a desired image generation prompt in order to reduce the cognitive burden on the user in operating the software application layer and reducing the user's idle time within the web or mobile application, thereby conserving battery on the client device. In some implementations, the software application layer can repopulate the explore menu with new or additional example images based on text entered into the interactive field by the user. For example, in response to receiving a text input to the interactive text field, the system can perform a natural search and/or text-to-image over a set of available example prompt and generated image pairs in order to identify examples that are most relevant to the text prompt entered by the user. The software application layer 124 can then replace the display(s) of one or more of the image tiles within the explore menu with new image tiles with more relevant example images.

The generation interface 400 also includes a style menu 404 that enables the user to browse and select among pre-set image styles for the image generation request. In the example of FIG. 4A, the style menu 404 displays a set (e.g., array) of style option tiles, each style option tile including a text description of the image style (e.g., anime, Van Gogh, oil painting, line drawing, digital art, etc.) and a sample image in the corresponding style. In response to detecting a horizontal swipe (or scroll) input on a display or trackpad over the style menu area, the software application layer 124 can transition the display of the style menu to replace currently displayed style option tiles with other style option tiles. Additionally or alternatively, in response to detecting a user input (e.g., a touch input, a click) on a "see all" affordance (e.g., button, link) 410 located adjacent to the style menu, the software application layer can expand the style menu in an overlay tab. FIG. 4C depicts an example of the overlay tab 412 for the style menu according to some embodiments. Overlay tab 412 can display a larger number of style option tiles 1 to 12 (and/or display style option tiles at a larger size or resolution) to enable the user to browse the set of supported pre-set image styles quickly and efficiently (e.g., via vertical swipe or scroll inputs). In response to detecting a user input (e.g., a touch input, a click) on a style option tile, the software application layer 124 can visually emphasize display of the selected style option tile—such as by shading, highlighting, or displaying a box around the selected style option tile—in order to provide visual feedback to the user. Thus, the software application layer 124 and inspiration affordance can assist the user in deciding on a type of image they wish to generate by providing visual examples of (possible) image styles and enabling users to select among pre-set styles without requiring the user to develop and/or phrase image generation prompts that include stylistic constraints, thereby reducing the cognitive burden on the user in operating the software application layer and increasing the likelihood that the image subsequently generated by the text-to-image diffusion model 112 will align with user expectations.

In implementations, the generation interface 400 also includes an advanced settings menu enabling the user to specify additional constraints on and/or parameters of an image generation request. In the example of the mobile interface, the generation interface includes an "advanced settings" affordance (e.g., a button, a link). In response to detecting a user input (e.g., a touch input, a click) on the advanced settings affordance, the software application layer can cause the device to display the advanced settings menu as an overlay tab that includes a second interactive text field and a creativity slider element. The advanced settings menu can include a header prompting the user to enter a negative prompt (e.g., a description of subject matter that the generated image should not include). Additionally, the creativity slider enables the user to specify and/or change a creativity level for the text-to-image diffusion model 112 when generating the requested image, where a lower creativity level corresponds to stricter adherence to the subject matter, style, and/or other constraints specified in the image generation request (e.g., by increasing the base image diffusion model 120's cross-attention to the text prompt during text-to-image synthesis) and a higher creativity level allows a wider range of possible image outputs (e.g., by reducing the base image diffusion models 120 cross-attention to the text prompt during text-to-image synthesis). The software application 124 can then close and/or minimize the advanced settings menu and return to displaying the generation interface in response to a user input (e.g., a downward swipe) on the overlay tab.

In response to detecting a user input (e.g., a touch input, a click) on the generate affordance, the software application layer 124 can then construct an image generation request based on the text prompt entered into the interactive text box, and, if applicable, the style selected by the user, a negative prompt entered within the advanced settings menu, and/or a creativity level designated by the user within the advanced settings menu. In some implementations, the software application layer 124 is configured to automatically modify and/or edit the text prompt entered into the interactive text field based on a style selection at the generation interface and/or negative prompts entered by the user in the advanced settings menu. For example, if the user enters the image description "an astronaut riding a unicorn through the Milky Way" and selects the "Van Gogh" style, the software application layer may modify or edit the image description to recite "an astronaut riding a unicorn through the Milky Way in the style of Vincent Van Gogh." In another example where the user enters the same image description but selects the "pencil drawing" style, the software application layer may modify or edit the image description to recite "a detailed pencil drawing of an astronaut riding a unicorn through the Milky Way." The software application layer 124 can therefore automatically incorporate selections and constraints entered (by a user) at the generation interface into the text prompt to be interpretable by the text-to-image diffusion model 112 without requiring users develop or phrase image descriptions that include these selections and constraints in a semantically optimal (or even plausible) manner.

In implementations, acceptable text prompts may be limited to a fixed number of characters, words, and/or tokens in order to reduce the amount of time needed for image generation and/or reduce serving latency. In these implementations, the software application layer 124 can calculate a word, character, or token count from the text prompt (e.g., text entered or input by the user into the interactive text field after any modifications or edits made by the software application layer 124 as described above); compare the word, character, or token count to a preset limit; and in response to determining that the word, character, or token count meets (e.g., exceeds) the preset limit, decline to send the image generation task to the communication and cause the generation interface to display an error message near the interactive text field. For example, the software application layer 124 can change the display of interactive field to include a red outline and/or display an error message in red typeface beneath the interactive text field (e.g., "Maximum word count exceeded, please edit your description and try again"), which may additionally or alternatively be accompanied by audio or haptic feedback.

In response to determining that the text prompt falls within (e.g., below) the pre-set word, character, and/or token limit, the software application layer 124 can construct an image generation request (e.g., task) and submit the image generation request to the text-to-image diffusion model 112 via the communication interface 122. In the example where the communication interface 122 defines an application programming interface, the software application layer 124 can automatically construct an API call to an endpoint URL associated with the text-to-image diffusion model 112 that includes the text prompt, the creativity level (if applicable), and metadata identifying the task and associated user account as form data.

Concurrently (e.g., after submitting the image generation request to the communication interface 122 while performing the image generation and/or content moderation steps described above), the software application layer 124 can cause the device to transition the display of the generation interface to a waiting screen while the system performs image generation and/or content moderation tasks. For example, the waiting screen can include a message informing the user that image generation task is being processed and/or a graphical element, such as an animation, progress bar, or a dynamic "estimated time remaining" message that displays and/or represents the remaining generation time (e.g., 10 seconds, 5 seconds, etc.). The software application layer 124 can display the waiting screen on top of (e.g., over, above) the generation interface 400 (e.g., on an opaque background) while continuing to display the explore menu (e.g., as an overlay tab) to allow the user to browse through example images previously generated by the text-to-image diffusion model 112 while the system processes the current image generation request. In implementations where image generation tasks are subject to content moderation, the software application layer 124 is configured to transition display of the waiting screen back to the generation interface (e.g., the generation interface shown in FIG. 4A) in response to receiving the error message from the communication interface 122 (e.g., based on outputs of the text classifier, based on outputs of the visual classifier). In these implementations, the software application layer 124 can display the error message (e.g., as a pop-up dialog box over the generation interface or adjacent to the interactive text field) informing the user that system declined to generate the requested image (e.g., "Could not generate that image—please try again with a different prompt"). The error message displayed to the user may also include a reason for the moderation decision based on a classification of the prompt by the text classifier or based on a classification of the base image by the visual classifier.

Concurrently (e.g., after the base diffusion model has generated the base image and while the executing the high-resolution diffusion model(s), after the communication interface 122 has output the generated image(s)), the software application layer 124 can transition display of the waiting screen to the results interface. FIG. 4D depicts an example of the results interface 414 according to some embodiments. Results interface 414 displays (a preview of) the image(s) 1 to 6 generated by the text-to-image diffusion model 112 at 416 in response to the image generation request and a description field 418 that displays the text prompt submitted to the model. If the image generation request included a style selected at the generation interface, the description tile can also display a style tag 420 identifying the style of "Mystical" for the generated image(s) 1 to 6.

The results interface 414 may also include a regenerate affordance (e.g., a button, a link) that enables the user to submit another image generation request (or resubmit an image generation task using the same prompt). More specifically, in response to receiving a user input (e.g., a touch input to a display, a click) over the description field, the software application can allow the user to edit text displayed in the description field (e.g., by displaying a touch keyboard below the description field, through keyboard inputs) prior to submitting a follow-up image generation request via the regenerate affordance. While the system is executing the set of the high-resolution diffusion models 116 to upsample base images corresponding to the image generation request, the software application layer 124 can keep the regenerate affordance in a disabled (e.g., deactivated) state, indicated visually to the user by greying out the regenerate affordance and/or displaying a "generating" message on the affordance and display a "rendering" message elsewhere on the results interface. Upon receiving the final, upsampled image(s) from the communication interface 122, the software application layer 124 can: cease to display the rendering message; replace display of the low-resolution preview (e.g., base) images with final, upsampled versions; and activate the regenerate affordance, The software application layer 124 can then tag and/or index the final, upsampled image(s) received from the text-to-image diffusion model 112 and associate these images with the user's account and/or identifier, enabling the user to view generated results at a later time though a history interface (e.g., "My Creations"). Additionally or alternatively, the software application layer 124 can display an export affordance at the results interface and/or the history interface enabling images generated by the text-to-image diffusion model 112 to be saved, downloaded and/or shared (e.g., via a URL) in response to user inputs.

Computer System

Figure 5:
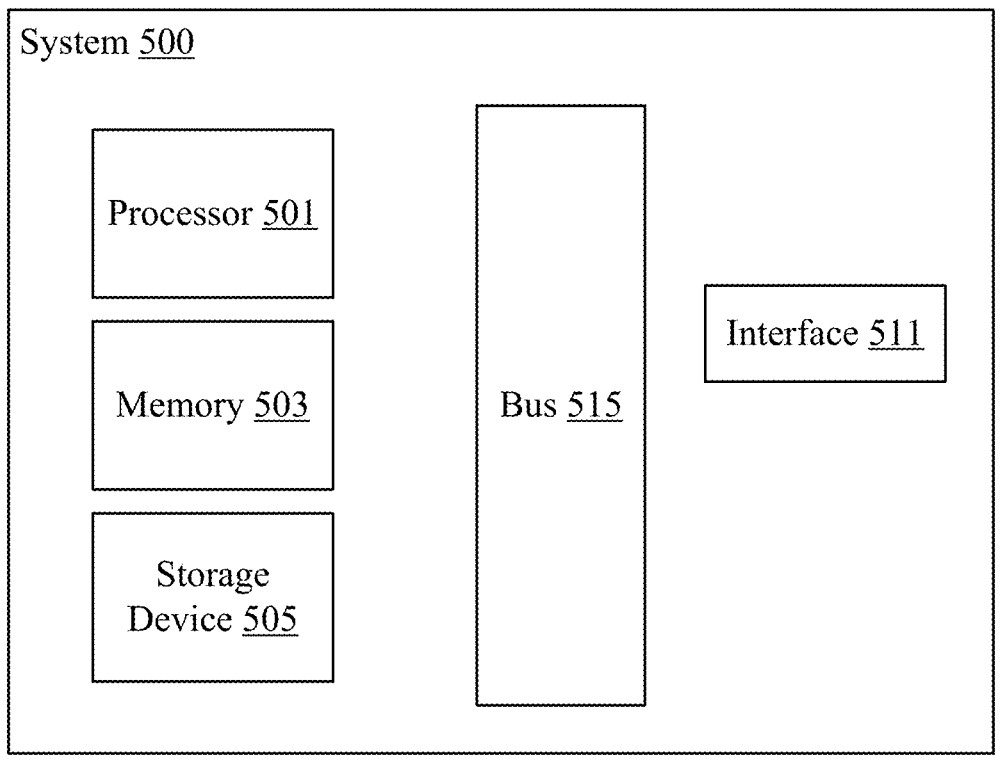
FIG. 5 illustrates one example of a computing device according to some embodiments.

FIG. 5 illustrates one example of a computing device according to some embodiments. According to various embodiments, a system 500 suitable for implementing embodiments described herein includes a processor 501, a memory module 503, a storage device 505, an interface 511, and a bus 515 (e.g., a PCI bus or other interconnection fabric.) System 500 may operate as a variety of devices such as server system 102 or client device 104, or any other device or service described herein. Although a particular configuration is described, a variety of alternative configurations are possible. The processor 501 may perform operations such as those described herein. Instructions for performing such operations may be embodied in the memory 503, on one or more non-transitory computer readable media, or on some other storage device. Various specially configured devices can also be used in place of or in addition to the processor 501. Memory 503 may be random access memory (RAM) or other dynamic storage devices. Storage device 505 may include a non-transitory computer-readable storage medium holding information, instructions, or some combination thereof, for example instructions that when executed by the processor 501, cause processor 501 to be configured or operable to perform one or more operations of a method as described herein. Bus 515 or other communication components may support communication of information within system 500. The interface 511 may be connected to bus 515 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving a text prompt;
   executing a text encoder on the text prompt to generate a representation;
   generating a set of images based on the representation and a set of parameters of an image generation model;
   ranking the set of images using reward values that are generated by a reward model, wherein the reward model is trained using human input that provided feedback on a quality of generated images using the image generation model; and
   outputting one or more images based on the ranking in response to the text prompt.

2. The method of claim 1, wherein executing the text encoder comprises:
   interpreting text of the text prompt to encode a semantic representation represented by the text in the representation.

3. The method of claim 1, wherein generating the set of images comprises:
   initializing a random distribution of noise; and
   iteratively denoise the random distribution of noise according to the parameters of the image generation model and a semantic representation of an image description encoded in the representation.

4. The method of claim 1, wherein executing the text encoder comprises:
   generating multiple embedding representations in different embedding spaces using multiple text encoder models.

5. The method of claim 4, further comprising:
   inputting the multiple text embedding representations into one or more image generation models to generate the set of images; and
   ranking the set of images to select a subset of images as the set of images.

6. The method of claim 1, further comprising:
   executing a high resolution model to upsample one or more base images based on parameters of the high resolution model to generate the set of images.

7. The method of claim 6, wherein executing the high resolution model comprises:
   iteratively denoising the base image to progressively upsample the base image to a higher resolution.

8. The method of claim 7, wherein executing the high resolution model comprises:
   upsampling visual aspects of the one or more base images generated by the image generation model.

9. The method of claim 1, further comprising:
   training the image generation model to train the parameters for the image generation model.

10. The method of claim 9, wherein training the image generation model comprises:
    receiving a set of training images and text captions describing training images in the set of training images;
    executing the image generation model on the set of training images to train the set of parameters, wherein training the set of parameters comprises:
    generating a first set of generated images based on the text captions;
    comparing the first set of generated images to corresponding training images associated with the text captions;
    adjusting the set of parameters of the image generation model based on the comparing to generate an adjusted set of parameters; and
    generating a final set of parameters from the adjusted set of parameters based on reward values for a second set of generated images by the image generation model using the adjusted set of parameters, wherein the reward values are generated by a reward model that is trained using human input that provided feedback on a quality of the generated images.

11. The method of claim 10, wherein the set of training images comprises a first set of training images, the method further comprising:
    receiving a second set of training images; and
    removing images from the second set of training images to form the first set of training images, wherein images that are removed do not meet a threshold based on quality.

12. The method of claim 10, wherein executing the model on the set of training images to train the set of parameters comprises:
generating a set of representations for the set of training images; and
using the set of representations to generate a set of base images using the image generation model.

13. The method of claim 12, wherein executing the image generation model on the set of training images to train the set of parameters comprises:
training the set of parameters based on learning a correlation between text captions and associated base images.

14. The method of claim 13, wherein using the set of representations to generate base images comprises:
initializing a random distribution of noise for a base image in the set of base images;
iteratively denoise the random distribution of noise according to the set of parameters of the image generation model and a semantic representation of an image description encoded in the representation; and
iteratively training the set of parameters based on the iteratively denoising of the random distribution of noise.

15. The method of claim 14, wherein executing the image generation model on the set of training images to train the set of parameters comprises:
iteratively denoising the base image to progressively upsample the base image to a higher resolution according to a set of high resolution parameters of the image generation model; and
iteratively training the set of high resolution parameters based on the iteratively denoising of the base image.

16. The method of claim 15, wherein generating the final set of parameters from the set of parameters based on reward values for the generated images comprises:
generating a first generated image in the second set of generated images using the set of parameters of the image generation model;
generating a second generated image in the second set of generated images using the adjusted set of parameters of the image generation model;
generating a first reward value for the first generated image and a second reward value for the second generated image using the reward model;
generating a third reward value based on a difference between the first reward value and the second reward value; and
refining the adjusted set of parameters based on the third reward value.

17. The method of claim 1, wherein training the reward model comprises:
generating a reward value for a generated image;
comparing the reward value to feedback from the human input; and
adjusting one or more parameters of the reward model based on the comparing.

18. The method of claim 1, wherein ranking the set of images using reward values comprises:
analyzing the set of images;
computing a set of reward values for the set of images; and
ranking the set of images based on respective reward values of images in the set of images.

19. A non-transitory computer-readable storage medium having stored thereon computer executable instructions, which when executed by a computing device, cause the computing device to be operable for:
receiving a text prompt;
executing a text encoder on the text prompt to generate a representation;
generating a set of images based on the representation and a set of parameters of an image generation model;
ranking the set of images using reward values that are generated by a reward model, wherein the reward model is trained using human input that provided feedback on a quality of generated images using the image generation model; and
outputting one or more images based on the ranking in response to the text prompt.

20. An apparatus comprising:
one or more computer processors; and
a computer-readable storage medium comprising instructions for controlling the one or more computer processors to be operable for:
receiving a text prompt;
executing a text encoder on the text prompt to generate a representation;
generating a set of images based on the representation and a set of parameters of an image generation model;
ranking the set of images using reward values that are generated by a reward model, wherein the reward model is trained using human input that provided feedback on a quality of generated images using the image generation model; and
outputting one or more images based on the ranking in response to the text prompt.

* * * * *